(12) United States Patent
Suzuki et al.

(10) Patent No.: US 11,104,235 B2
(45) Date of Patent: Aug. 31, 2021

(54) CHARGING MANAGEMENT SYSTEM

(71) Applicants: Kabushiki Kaisha Toshiba, Minato-ku (JP); Toshiba Solutions Corporation, Kawasaki (JP)

(72) Inventors: Hiroyuki Suzuki, Hino (JP); Tsuyoshi Shimada, Mitaka (JP); Norikazu Hosaka, Higashiyamato (JP); Naoki Yamaguchi, Fuchu (JP); Motohiro Takeuchi, Tama (JP); Kenji Kojima, Kawasaki (JP)

(73) Assignees: Kabushiki Kaisha Toshiba, Minato-ku (JP); Toshiba Solutions Corporation, Kawasaki (JP)

( * ) Notice: Subject to any disclaimer, the term of this patent is extended or adjusted under 35 U.S.C. 154(b) by 857 days.

(21) Appl. No.: 14/622,335

(22) Filed: Feb. 13, 2015

(65) Prior Publication Data
US 2015/0151642 A1    Jun. 4, 2015

Related U.S. Application Data

(63) Continuation of application No. PCT/JP2013/072115, filed on Aug. 19, 2013.

(30) Foreign Application Priority Data

Aug. 17, 2012    (JP) .............................. JP2012-180865

(51) Int. Cl.
*G06F 1/26*    (2006.01)
*B60L 53/00*    (2019.01)
(Continued)

(52) U.S. Cl.
CPC .......... *B60L 53/00* (2019.02); *B60L 11/1809* (2013.01); *B60L 53/305* (2019.02); *B60L 53/53* (2019.02);
(Continued)

(58) Field of Classification Search
USPC ........................... 705/7.11, 5; 347/22; 191/6
See application file for complete search history.

(56) References Cited

U.S. PATENT DOCUMENTS

2010/0217485 A1    8/2010 Ichishi
2011/0285345 A1    11/2011 Kawai et al.
(Continued)

FOREIGN PATENT DOCUMENTS

CN    1581191 A    2/2005
CN    101878576 A    11/2010
(Continued)

OTHER PUBLICATIONS

Combined Chinese Office Action and Search Report dated Jun. 3, 2016 in Patent Application No. 201380044190.0 (with English Translation).
(Continued)

*Primary Examiner* — Akiba K Robinson
(74) *Attorney, Agent, or Firm* — Oblon, McClelland, Maier & Neustadt, L.L.P.

(57) ABSTRACT

According to one embodiment, there is provided a charging management system including a display controller configured to cause a display device to display a time slot which is settable as a new desired rental time slot of an electric vehicle, based on a charging time slot on an assumption that charging to the vehicle by a second charging device is performed, and a scheduling module configured to set the desired rental time slot as a time slot in which rental is possible, if the charging to the electric vehicle for enabling the rental is possible in the input desired rental time slot and the rental time slot in which the rental reservation has been made.

2 Claims, 11 Drawing Sheets

(51) Int. Cl.
*H02J 7/02* (2016.01)
*G08G 1/00* (2006.01)
*H02J 7/00* (2006.01)
*G07F 15/00* (2006.01)
*G06Q 10/06* (2012.01)
*B60L 53/53* (2019.01)
*B60L 53/30* (2019.01)
*B60L 11/18* (2006.01)
*G06Q 10/02* (2012.01)
*G06Q 10/10* (2012.01)
*G06Q 30/06* (2012.01)

(52) U.S. Cl.
CPC ......... *G06Q 10/02* (2013.01); *G06Q 10/0631* (2013.01); *G06Q 10/109* (2013.01); *G06Q 30/0645* (2013.01); *G07F 15/005* (2013.01); *G08G 1/00* (2013.01); *H02J 7/00* (2013.01); *H02J 7/02* (2013.01); *H02J 7/0021* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | | |
|---|---|---|---|---|
| 2012/0089286 A1* | 4/2012 | Nakata | ............... | B60L 50/40 701/22 |
| 2012/0101755 A1* | 4/2012 | Hirasawa | ............ | H01M 10/48 702/63 |
| 2015/0199619 A1* | 7/2015 | Ichinose | ............ | G01C 21/3469 705/5 |
| 2015/0326040 A1 | 11/2015 | Kawai et al. | | |
| 2016/0107534 A1* | 4/2016 | Ikeda | ................. | B60L 11/1816 307/9.1 |
| 2016/0329717 A1* | 11/2016 | Kudo | ....................... | H02J 3/46 |

FOREIGN PATENT DOCUMENTS

| | | |
|---|---|---|
| CN | 102570535 B | 9/2015 |
| EP | 2 219 278 A1 | 8/2010 |
| EP | 2 388 884 A2 | 11/2011 |
| JP | 2009-136109 A | 6/2009 |
| JP | 2010-231258 A | 10/2010 |
| JP | 2012-005341 A | 1/2012 |
| JP | 2012-050222 A | 3/2012 |
| WO | WO 2011/118187 A1 | 9/2011 |
| WO | WO 2011/118193 A1 | 9/2011 |

OTHER PUBLICATIONS

International Search Report dated Sep. 17, 2013 for PCT/JP2013/072115 filed on Aug. 19, 2013 with English Translation.
International Written Opinion dated Sep. 17, 2013 for PCT/JP2013/072115 filed on Aug. 19, 2013.
Extended Search Report dated Mar. 24, 2016 in European Patent Application No. 13829407.9.
English translation of International Preliminary Report on Patentability and Written Opinion dated Feb. 26, 2015 in PCT/JP2013/072115.

* cited by examiner

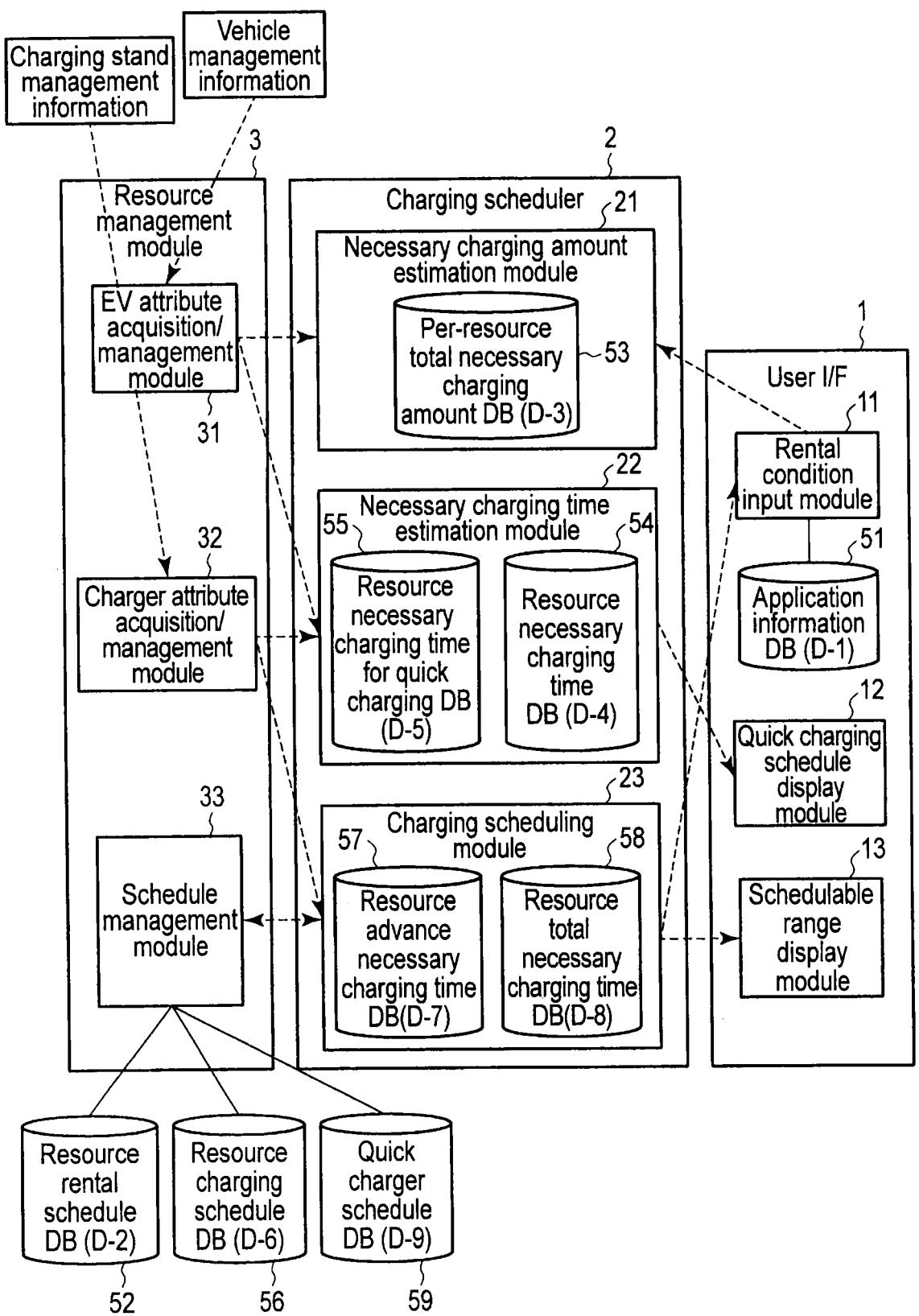
F I G. 1

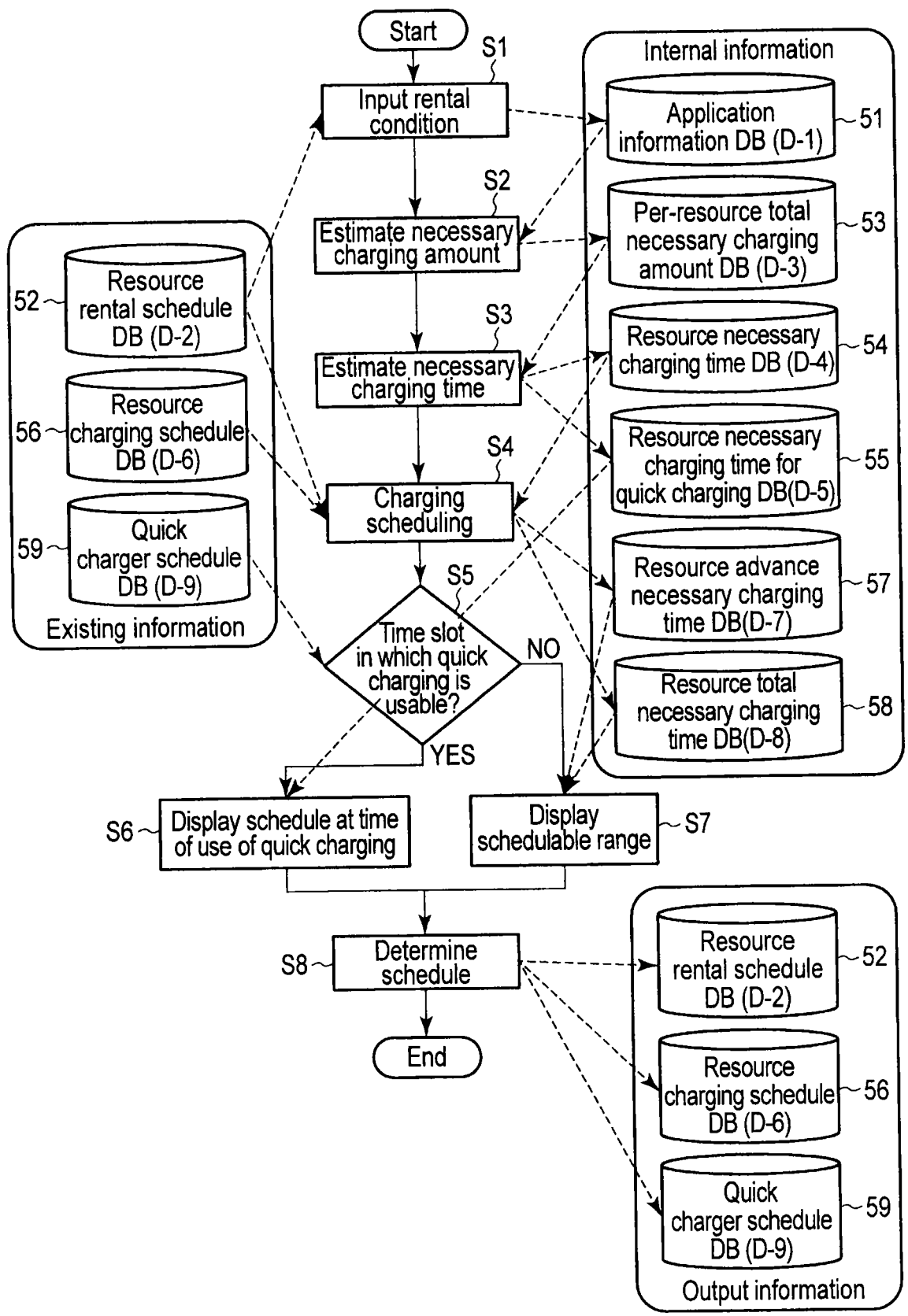
F I G. 2

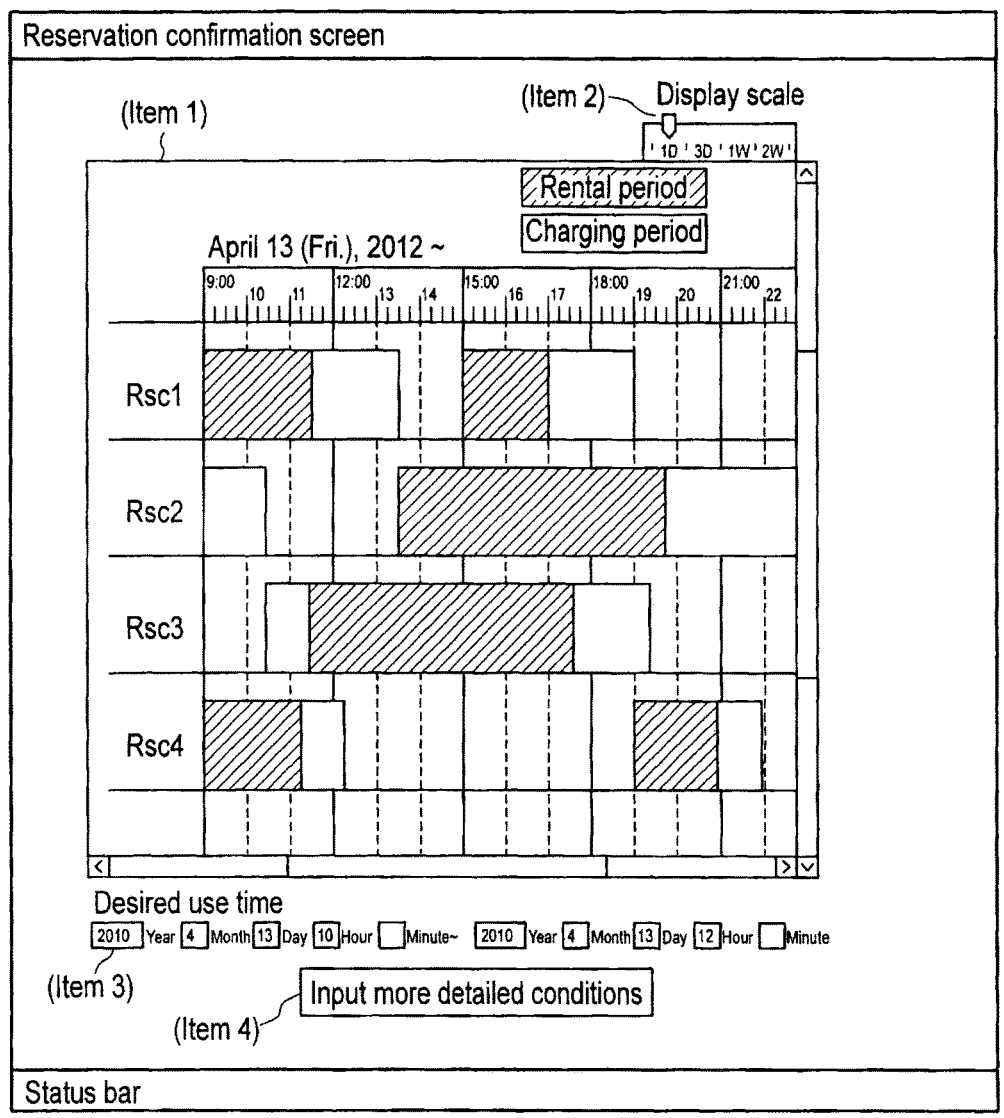
F I G. 3

Input detailed information

Tell how to use your EV. Allowance of charging time may be reduced.

| | Item | |
|---|---|---|
| 1 | Destination | |
| 2 | Planned travel distance | |
| 3 | Purpose of use | |
| 4 | Number of fellow passengers | |
| | | |
| | | |
| | | |
| | | |
| | | OK |

FIG. 4

| DB | No. | Vehicle name | Record type (rental/charging) | Actual charging use | Start time | End time |
|---|---|---|---|---|---|---|
| D-2 | 1 | Rsc1 | Rental | — | 8:00 | 10:00 |
| D-6 | 2 | Rsc1 | Charging | ○ | 10:00 | 12:00 |
| D-9 | 3 | Rsc1 | Quick charging | × | 10:00 | 10:30 |
| D-2 | 4 | Rsc1 | Rental | — | 17:00 | 20:00 |
| D-6 | 5 | Rsc1 | Charging | ○ | 20:00 | 22:30 |
| D-9 | 6 | Rsc1 | Quick charging | × | 20:00 | 20:30 |
F I G. 6
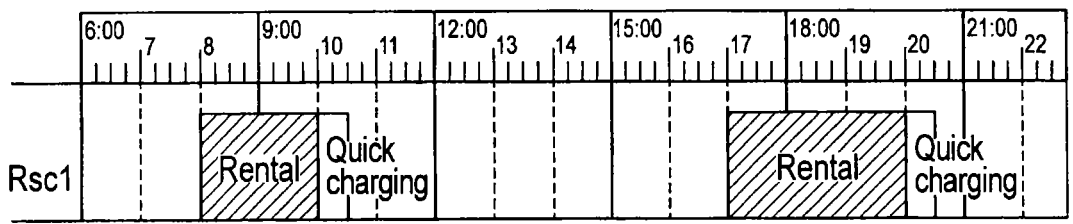
F I G. 7
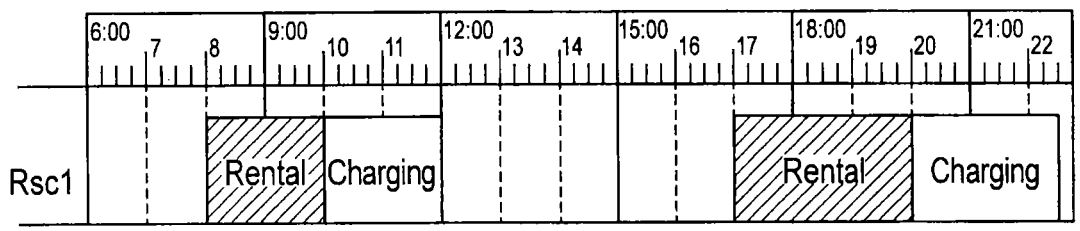
F I G. 8

| Item No. | Item | Summary | C-1 Initial | C2 Free 0 | C3 Reservation A | C4 Free 1 | C5 Reservation B | C6 Free 2 | C7 Reservation C | C8 Free 3 | C9 Final state |
|---|---|---|---|---|---|---|---|---|---|---|---|
| R-1 | Rental start time | Time instant of start of rental | | | 8:00 | | 14:00 | | 17:00 | | 24:00:00 |
| R-2 | Rental end time | Time instant of end of rental | 6:00 | | 10:00 | | 16:00 | | 20:00 | | |
| R-3 | Rental time | Time between R-2 and R-1 | | | 2:00 | | 2:00 | | 3:00 | | |
| R-4 | Rental-time power amount | Power amount at time of start of rental | | | 60 | | 61.66667 | | 48 | | |
| R-5 | Estimated power consumption amount | Estimation from content of application (not simply proportional to rental time) | | | 25 | | 20 | | 35 | | |
| R-6 | Rental-end-time residual battery capacity | Remainder left after subtraction of estimated power consumption amount (R-5) from rental-time power amount (R-4) | | | 35 | | 41.66667 | | 13 | | |
| R-7 | Retention power (MAX 100) | Initial value and final value | 60 | | | | | | | | 0 |
| R-8 | Free time | Period between rental end time (R-2) and rental start time (R-1) of next reservation | | 2:00 | | 4:00 | | 1:00 | | 4:00 | |
| R-9 | Free-time possible charging amount | Calculated based on free time (R-8) | | 13.33333 | | 26.66667 | | 6.666667 | | 26.66667 | |

F I G. 10A

| Item No. | Item | Summary | C-1 Initial | C2 Free 0 | C3 Reservation A | C4 Free 1 | C5 Reservation B | C6 Free 2 | C7 Reservation C | C8 Free 3 | C9 Final state |
|---|---|---|---|---|---|---|---|---|---|---|---|
| R-10 | Rental-start-time necessary residual battery capacity | Such charging amount at reservation start time that power amount does not become zero or less at end of next and following reservations and power amount of final value or more can finally be secured. Counting backward from final state | 33.33333 | | 46.66667 | | 48.33333 | | 35 | | 0 |
| R-11 | Necessary charging amount | Charging amount necessary for associated rental | | 0 | | 13.33333 | | 0 | | 0 | |
| R-12 | Resource total necessary charging time | Time needed to charge necessary charging amount (R-11) by using ordinary charging | | | 0:00 | | 0:15 | | 0:00 | | |

F I G. 10B

| Item No. | Item | Summary | C-1 Initial | C2 Free 0 | C3 Reservation A | C4 Free 1 | C5 Reservation B | C6 Free 2 | C7 Reservation C | C8 Free 3 | C9 Final state |
|---|---|---|---|---|---|---|---|---|---|---|---|
| R-13 | Necessary charging time for quick charging | Time needed to charge necessary charging amount (R-11) by using quick charging | | | 0 | | 0:05 | | 0:00 | | |
| R-14 | Largest possible charging amount | Charging amount at reserved rental start time in case of using all free-time possible charging amount (R-9) | | | 73.33333 | | 75 | | 61.66667 | | 53.3333333 |
| R-15 | Charging allowance | Difference between R-14 and R-10. If the difference becomes negative, power shutoff occurs during rental or charging becomes necessary, and schedule is not recommendable | 20 | | 26.66667 | | 26.66667 | | 26.66667 | | 20 |

FIG. 10C

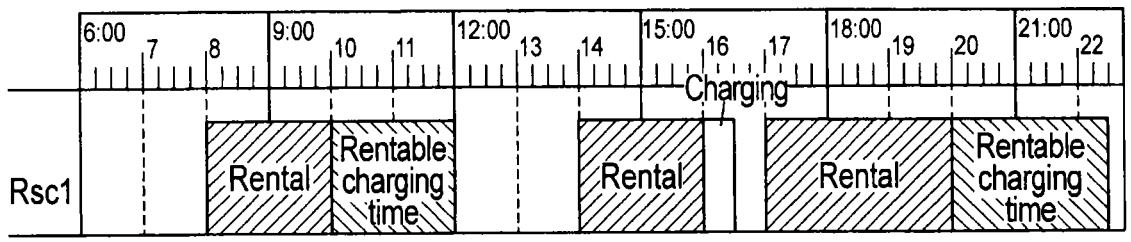
F I G. 11
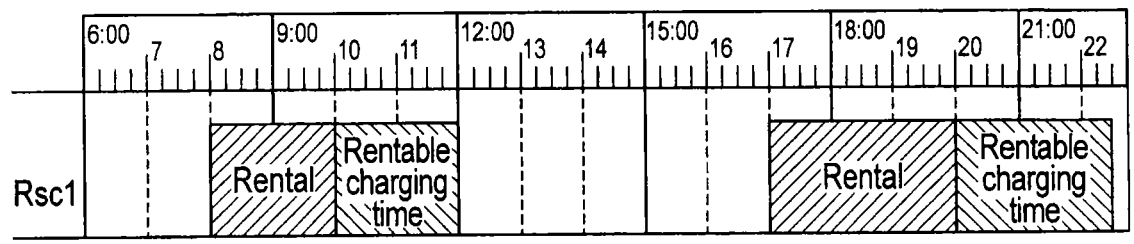
F I G. 12
| DB | No. | Vehicle name | Record type (rental/charging) | Charging plan applied to actual schedule ○:Applied ×:Not applied —:Irrelevant | Start time | End time |
|---|---|---|---|---|---|---|
| D-2 | 1 | Rsc1 | Rental | — | 8:00 | 10:00 |
| D-6 | 2 | Rsc1 | Charging | ○ | 10:00 | 12:00 |
| D-9 | 3 | Rsc1 | Quick charging | × | 10:00 | 10:30 |
| D-2 | 4 | Rsc1 | Rental | — | 14:00 | 16:00 |
| D-6 | 5 | Rsc1 | Charging | ○ | 16:00 | 17:00 |
| D-9 | 6 | Rsc1 | Quick charging | × | 16:00 | 16:10 |
| D-2 | 7 | Rsc1 | Rental | — | 17:00 | 20:00 |
| D-6 | 8 | Rsc1 | Charging | ○ | 20:00 | 23:30 |
| D-9 | 9 | Rsc1 | Quick charging | × | 20:00 | 20:30 |
F I G. 13

CHARGING MANAGEMENT SYSTEM

CROSS-REFERENCE TO RELATED APPLICATIONS

This application is a Continuation Application of PCT Application No. PCT/JP2013/072115, filed Aug. 19, 2013 and based upon and claiming the benefit of priority from Japanese Patent Application No. 2012-180865, filed Aug. 17, 2012, the entire contents of all of which are incorporated herein by reference.

FIELD

Embodiments described herein relate generally to a charging management system which manages charging of an electric vehicle.

BACKGROUND

Conventionally, like an electric vehicle (hereinafter referred to as "EV"; however, in the present application, the EV is not limited to a four-wheel vehicle, and includes a two-wheeled vehicle, a three-wheeled vehicle, etc. In addition, a plug-in hybrid vehicle, which can be charged from the outside, corresponds to the EV.), there has been a moving apparatus (hereinafter, EV is described as a typical apparatus) which moves by using as, an energy source, electric power stored in a battery which is built therein.

The time needed for charging in the battery in this electric vehicle is longer than the time needed for supplying gasoline to a gasoline vehicle.

In addition, the possible travel distance of the EV is shorter than the possible travel distance of the gasoline vehicle. It is thus necessary to frequency perform long-time charging for the EV.

Furthermore, charging for 6 hours to 8 hours is necessary for full charging to the EV. Thus, when the EV is used for car sharing or car rental, an interval of several hours or more for charging to the EV is necessary between one-time uses of the EV. Additionally, the operation efficiency of the EV, when used as the EV for car sharing or car rental, is low, and the profitability is low.

Besides, as other background art, there are a battery charging system which controls a company's own delivery vehicles mainly for delivery of goods by using delivery-of-goods plans and charging states, a vehicle management server, and a car sharing server.

As a method of shortening the time of charging to the EV, utilization of a quick charger is thinkable. If quick charging is performed, the time of charging to the EV can be reduced to about 30 minutes. However, the quick charger, including power supply equipment, is expensive. Thus, if the quick charger is operated in a concentrated manner, it is possible that the power system is affected. Consequently, it is difficult to prepare the quick charger for any of EVs. Hence, in order to enhance the operation efficiency of chargers as a whole, while paying attention to cost, it is necessary to combine quick chargers with ordinary chargers, a large number of which can be prepared.

In order to perform charging to the EV, two types of chargers, namely a charger for ordinary charging and a charger for quick charging, can be used. In this case, a description is given of a function which can be generally used for charging by a plurality of charging patterns with respect to a certain resource.

In order to improve the operation efficiency of the EV by well scheduling the charging by the quick charger and the charging by the ordinary charger, there are various applicable logics, such as a line manufacturing efficiency improvement algorithm in a factory in which machines with different capabilities are operated in parallel.

However, in the operation of car sharing or the like, applications for rental will occur irregularly, and the service provision time for applicants cannot greatly be changed systematically and efficiently. It is thus difficult to make an optimized rental plan, and a reservation system is basically adopted.

It is difficult for a rental user to designate the kind of charger in advance, or to control the charging schedule before rental. Thus, a scheme is needed which does not require a predetermined person to make a high-level judgment, and which enables, as a result, the predetermined person to schedule the use of quick charging for the charging before rental, and makes rental possible. The predetermined person is a person who needs to rent a predetermined EV. The predetermined EV is an EV whose rental schedule is close to a preceding schedule, and which cannot be used if ordinary charging is performed.

BRIEF DESCRIPTION OF DRAWINGS

FIG. 1 is a view illustrating a functional configuration example of a charging management system in the present embodiment;

FIG. 2 is a flowchart illustrating an example of the procedure for schedule screen display for rental reservation of a resource;

FIG. 3 is a view illustrating an example of a user use application screen;

FIG. 4 is a view illustrating an example of a detailed information input screen;

FIG. 6 is a view illustrating an example of a resource schedule in a table form;

FIG. 7 is a view illustrating an example of an initial display screen in a case where quick charging is possible;

FIG. 8 is a view illustrating an example of the initial display screen in a case where only ordinary charging can be performed;

FIG. 10A is a view illustrating information for confirming the necessary power amount in table form;

FIG. 10B is a view illustrating information for confirming the necessary power amount in table form;

FIG. 10C is a view illustrating information for confirming the necessary power amount in table form;

FIG. 11 is a view illustrating an example of the display screen of the rental time;

FIG. 12 is a view illustrating an example of the display screen of the schedulable time; and FIG. 13 is a view illustrating an example of a new rental schedule in a table form.

DETAILED DESCRIPTION

Figure 5:
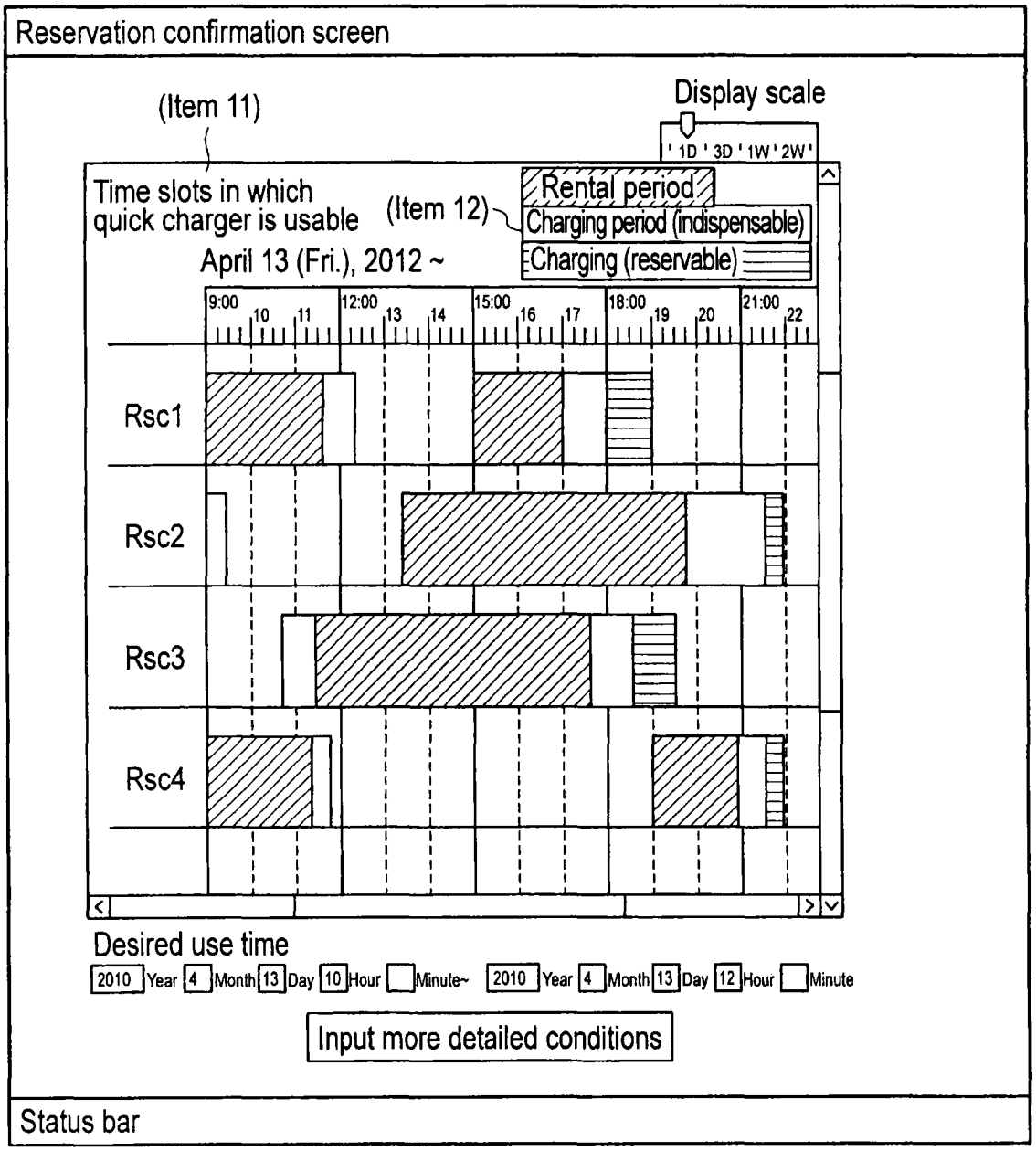
FIG. 5 is a view illustrating an example of a screen displaying a re-calculated schedule.

In general, according to one embodiment, there is provided a charging management system including a first charging device which charges an electric vehicle for rental, a second charging device which charges the electric vehicle in a shorter necessary time than the first charging device, and a management module configured to manage a rental time slot as a time slot in which a rental reservation of the electric vehicle has been made, and a charging time slot in which the second charging device is usable and charging to the electric vehicle by the second charging device is performed for enabling rental of the electric vehicle in the rental time slot, and a charging time slot in which the second charging device is not usable and charging to the electric vehicle by the first charging device is performed for enabling the rental of the electric vehicle in the rental time slot, and information indicating a transition of a stored power amount of the electric vehicle, due to the rental of the electric vehicle and the charging to the electric vehicle.

This charging management system includes a display controller configured to cause a display device to display a charging time slot on an assumption that the charging to the electric vehicle by the second charging device is performed in a time slot in which the second charging device is usable, a charging time slot of charging to the electric vehicle by the first charging device in a time slot in which the second charging device is not usable, and a time slot which is settable as a new desired rental time slot of the electric vehicle, based on the rental time slots managed by the management module; and an input module configured to accept an input of a desired rental time slot of the electric vehicle, in the time slots displayed by the display controller.

This charging management system includes a first estimation module configured to estimate a necessary power amount for renting the electric vehicle with respect to the desired rental time slot input by the input module.

This charging management system includes a second estimation module configured to estimate, based on the necessary power amount estimated by the first estimation module, a time slot in which charging by the first and second charging devices is necessary for enabling the rental of the electric vehicle in the input desired rental time slot.

This charging management system includes a scheduling module configured to set, based on the information managed by the management module, the input desired rental time slot as a time slot in which rental is possible, if the charging for enabling the rental of the electric vehicle in the input desired rental time slot and the rental time slot in which the rental reservation has been made is possible in the time slot estimated by the second estimation module.

Embodiments will be described hereinafter with reference to the accompanying drawings.

In order to improve the operation efficiency of EVs in a resource sharing system of car sharing or car rental of EVs, the embodiment provides a charging management system including a scheduler which devises display of a resource free time and a resource charging time.

In order to improve the operation efficiency of the EV, the charging management system in this embodiment first includes an enlarging function of a rental display time to a rental applicant of the EV (a display time of rental to a rental applicant) in a case of utilizing a quick charging time with respect to the EV. In addition, the charging management system in this embodiment secondly includes a function of decreasing a charging time by charging only a necessary power amount to the EV.

To begin with, a description is given of the enlarging function of the rental display time in the case of utilizing the quick charging time. This function is a function relating to the displaying of a predetermined schedule to the rental applicant of the EV in a time slot in which a quick charger is available. Actually, even if charging by ordinary charging is performed for a long time, a free time in a case of performing quick charging is shown to the rental applicant. If this function is used, the rental applicant does not need to be aware of the type of charger to be used. In addition the charger, which is actually used after the rental application, is determined on the charging management system side. Specifically, the improvement of the operation efficiency of the EV by the utilization of the quick charger can be expected.

Next, a description is given of the function of charging only a necessary power amount to the EV. Although depending on the form of use of the EV, the power consumption in the rental time of the EV as a shared resource is, in many cases, lower than in the case in which the EV continues to be operated. For example, when the EV is used for transport to shopping or movie, the time in which the rental user actually drives the EV is about one hour, even if the rental time is three hours on the application.

If the necessary charging amount for the EV is judged based on only the rental time of the EV, it is estimated that a residual battery capacity, by which the EV can drive for three hours, is necessary as the residual battery capacity of the EV. However, if the condition for the rental of the EV is clarified, for example, if it is made clear that the purpose is shopping and the destination is a shopping mall, the residual battery capacity of the EV becomes sufficient if it is a residual battery capacity necessary for driving to and from the shopping mall which is the destination of the rental applicant of the EV.

The charging time to the EV can be reduced, if the charging amount that is actually necessary for operating the resource can be estimated and the value of this estimated charging amount becomes less than in the conventional method, for example, a method in which charging is always performed for a predetermined time or more so that no problem arises even if the resource is used for various purposes. By reducing the charging time, the time in which the EV is rented to other users can be increased. Therefore, the operation efficiency of the EV can be improved.

In addition, if the above-described necessary charging amount can be estimated, it becomes possible to implement a function of distinguishing the "charging time necessary for rental of the EV" and the "charging amount necessary for a subsequent rental after the end of the rental", and displaying, as a time slot in which the EV is rentable, a time after the time in which the charging time necessary for EV rental can be secured within the free time with no EV rental pan.

In the present embodiment, by implementing these two kinds of functions, it is not always necessary to set a long time as an EV rental time, as in the existing system, and it becomes possible to make a flexible reservation within such a range as not to affect an already secured rental reservation.

FIG. 1 is a view illustrating a functional configuration example of a charging management system in the present embodiment.

As illustrated in FIG. 1, the charging management system in the embodiment includes a user interface (I/F) 1, a charging scheduler 2, and a resource management module 3.

The user I/F 1 includes a rental condition input module 11, a quick charging schedule display module 12, and a schedulable range display module 13.

The rental condition input module 11 accepts an operation for a new input or a change of the rental condition at a time of a rental reservation by a user who uses an EV as a shared resource. The rental condition input module 11 stores the content of the new input or change of the rental condition in an application information DB (database) (D-1) 51. A device for accepting an operation is, for instance, a keyboard or a mouth, which is not illustrated here.

With respect to each EV, the quick charging schedule display module 12 displays, on a display device not illustrated here, a schedule on an assumption that quick charging is performed. The display device is, for instance, a liquid crystal display.

The schedulable range display module 13 displays, on the display device, a time slot, which can be set as a desired EV rental time slot as an EV rental schedulable range.

The charging scheduler 2 includes a necessary charging amount estimation module 21, a necessary charging time estimation module 22, and a charging scheduling module 23.

The necessary charging amount estimation module 21 estimates a necessary charging amount as power necessary at a time of resource rental.

The necessary charging time estimation module 22 estimates a necessary charging time as a time necessary for charging the necessary charging amount estimated by the necessary charging amount estimation module 21.

The charging scheduling module 23 manages a rental/charging schedule of the shared resource, and presents a candidate of a rentable EV to a reservation applicant in accordance with a rental reservation application. In addition, the charging scheduling module 23 displays the rental/charging schedule of the resource in accordance with a viewing request from the reservation applicant.

The resource management module 3 includes an EV attribute acquisition/management module 31, a charger attribute acquisition/management module 32, and a schedule management module 33.

The EV attribute acquisition/management module 31 acquires and manages attribute information of the EV, based on vehicle management information from the outside.

The charger attribute acquisition/management module 32 acquires and manages attribute information of a charging stand, based on charging stand (charger) management information from the outside.

The schedule management module 33 manages the rental/charging schedule of the EV. In addition, the schedule management module 33 manages the information of a user who rents the EV.

Next, various databases (DB) are described.

The user I/F 1 includes the application information DB (D-1) 51.

The necessary charging amount estimation module 21 of the charging scheduler 2 includes a per-resource total necessary charging amount DB (D-3) 53. In addition, the necessary charging time estimation module 22 of the charging scheduler 2 includes a resource necessary charging time DB (D-4) 54 and a resource necessary charging time for quick charging DB (D-5) 55. Further, the charging scheduling module 23 of the charging scheduler 2 includes a resource advance necessary charging time DB (D-7) 57 and a resource total necessary charging time DB (D-8) 58.

Aside from the user interface (I/F), charging scheduler 2 and resource management module 3, the charging management system in the present embodiment includes a resource rental schedule DB (D-2) 52, a resource charging schedule DB (D-6) 56, and a quick charger schedule DB (D-9) 59.

The application information DB (D-1) 51 stores application information as information that is input when the user applies for resource rental. As the application information, a rental time slot and information for identifying a rental user, such as a user ID, are indispensable. In addition, the application information includes, as dispensable information, information for estimating a resource power consumption amount after the start of rental. This information is, for instance, a destination, a purpose, the number of users, etc.

The resource rental schedule DB (D-2) 52 stores a resource rental schedule as information recording a plan as to who uses a resource, and when.

The per-resource total necessary charging amount DB (D-3) 53 stores an estimated necessary charging amount as a power amount which is necessary at a time of rental of the resource.

The resource necessary charging time DB (D-4) 54 stores information of a time necessary for charging, by ordinary charging, the necessary charging amount indicated by the per-resource total necessary charging amount DB (D-3) 53. This stored information is finally stored in the resource charging schedule DB (D-6) 56.

The resource necessary charging time for quick charging DB (D-5) 55 stores information of a time necessary for charging, by quick charging, the necessary charging amount indicated by the per-resource total necessary charging amount DB (D-3) 53. This stored information is finally stored in the quick charger schedule DB (D-9) 59.

The resource charging schedule DB (D-6) 56 stores information in which the charging time necessary at a time of performing ordinary charging, which corresponds to each resource rental and is stored in the resource necessary charging time DB (D-4) 54, is scheduled in association with resources.

The resource advance necessary charging time DB (D-7) 57 stores, prior to resource rental, a calculation result of the charging time which is thought to be necessary in order to avoid the occurrence of a failure of the schedule. The failure of the schedule means, for example, power shutoff (a condition in which the charging amount in the battery has decreased so that the EV becomes inoperable) at any time point after the rental that is an object.

The resource total necessary charging time DB (D-8) 58 stores a calculation result of the charging time which requires scheduling for charging. It does not matter whether this charging time is after the resource use nor not.

The quick charger schedule DB (D-9) 59 stores information in which the charging time necessary at a time of performing quick charging, which is the time indicated by the information stored in the resource necessary charging time for quick charging DB (D-5) 55, is scheduled in association with resources.

Next, a description is given of a process procedure at a time of executing resource rental reservation by the user.

FIG. 2 is a flowchart illustrating an example of the procedure for schedule screen display for rental reservation of a resource.

FIG. 3 is a view illustrating an example of a user use application screen.

The rental condition input module 11 of the user interface 1 accepts an input of an application condition of resource rental on the user use application screen illustrated in FIG. 3 (step S1).

This user use application screen is an example of an initial screen which is first displayed when the user uses resource rental.

(Item 1) on the user use application screen indicates a schedule of use of EVs which are rented. This item is an item for causing the user to visually recognize the time in which the EV is free, and causing this user to create a rental plan of the EV.

(Item 2) on the user use application screen is an item for setting a display scale of a use schedule as the scale indicated by (Item 1).

(Item 3) on the user use application screen is an item for inputting a desired rental time slot of the resource. This desired rental time slot is a start date/time and an end date/time of a desired use time.

FIG. 4 is a view illustrating an example of a detailed information input screen.

(Item 4) on the user use application screen is an icon which the user is prompted to choose in order to display the detailed information input screen illustrated in FIG. 4.

This detailed information input screen is a screen for inputting more detailed application conditions than the information which was input on the user use application screen illustrated in FIG. 3. The input application conditions are stored in the application information DB (D-1) 51.

At a time point when the user use application screen has been displayed as the initial screen, the necessary charging amount of the EV is not clear. Thus, a charging schedule, which can be acquired, cannot exactly be displayed. In the case where a charging schedule is displayed at this time, a charging schedule, which secures a safety margin of the same degree as in a conventional car sharing system, is displayed. Specifically, a charging time, which is necessary for charging power of a charging amount that is considered necessary and sufficient in ordinary rental, is indicated.

In this case, in the time slot in which quick charging to the EV is possible, the quick charging schedule display module 12 sets the charging time to be a time in the case of performing quick charging. The quick charging schedule display module 12 compares this charging time with the time in the case of performing ordinary charging, and displays the charging time as an apparently shortened charging time. The time slot in which quick charging to the EV is possible means, for example, a time slot in which the quick charger is free, or a time slot in which the EV, which completed immediately previous quick charging, has already left a place for quick charging.

In this case, in the time slot in which quick charging to the EV is not possible, the quick charging schedule display module 12 displays, as an indispensable charging time, a time necessary for supplying a necessary charging amount by an ordinary charger (a charging amount calculated by adding a margin, which is considered statistically necessary, to an estimated necessary charging amount). The quick charging schedule display module 12 displays, as a reservable charging time, a time necessary for charging power exceeding this necessary charging amount. The time slot in which quick charging to the EV is not possible means, for example, a time slot in which quick charging is being performed, and a time slot in which a space for performing quick charging has not yet been occupied by another EV.

If time slots in which rental is possible are to be increased, it is desirable that the user input detailed information relating to rental as much as possible. The reason for this is that, as the information relating to rental becomes clearer, the accuracy of estimation of a necessary charging amount increases and the margin for charging can be decreased.

After the user inputs information for application, the necessary charging amount estimation module 21 estimates the necessary charging amount as the power amount necessary for rental with respect to each EV, based on the content of the application information stored in the application information DB (D-1) 51 (step S2). The estimation model for estimation of the necessary charging amount and the accuracy of estimation of the necessary charging amount vary depending on the input information.

The necessary charging amount estimation module 21 stores the information of the necessary charging amount, which has been estimated as described above, in the per-resource total necessary charging amount DB (D-3) 53.

Then, based on the estimation value of the necessary charging amount as the value estimated by the necessary charging amount estimation module 21 and stored in the per-resource total necessary charging amount DB (D-3) 53, the necessary charging time estimation module 22 estimates a necessary charging time as a connection time between the charger and EV, which is necessary for satisfying this charging amount (step S3).

The charging time is different between the case of using the ordinary charger and the case of using the quick charger. Thus, the necessary charging time estimation module 22 estimates the necessary charging time in the case of using the ordinary charger, and the necessary charging time in the case of using the quick charger, respectively. In addition, when a charger, which can perform charging more quickly than the quick charger, has been introduced, the necessary charging time estimation module 22 separately estimates a necessary charging time in the case of using this charger.

The necessary charging time estimation module 22 stores the estimated result of the necessary charging time in the case of using the ordinary charger in the resource necessary charging time DB (D-4) 54. In addition, the necessary charging time estimation module 22 stores the estimated result of the necessary charging time in the case of using the quick charger in the resource necessary charging time for quick charging DB (D-5) 55.

Next, the charging scheduling module 23 reads out the information stored in the resource necessary charging time DB (D-4) 54, resource necessary charging time for quick charging DB (D-5) 55 and per-resource total necessary charging amount DB (D-3) 53, and the information stored in the resource rental schedule DB (D-2) 52, resource charging schedule DB (D-6) 56 and quick charger schedule DB (D-9) 59 (step S4).

Based on the read-out information, the charging scheduling module 23 determines whether the resource rental time as the time indicated by the rental condition input in S1 overlaps another already determined rental time.

If the rental time indicated by the rental condition does not overlap another rental time, the charging scheduling module 23 calculates a time necessary for charging the necessary charging amount for EV rental by using the ordinary charger, based on the difference between the residual battery capacity before the EV rental and the necessary charging amount estimated in step S2 (resource total necessary charging time (D-8)).

In addition, the charging scheduling module 23 calculates, as a first process, a time necessary for charging for avoiding power shutoff at a subsequent rental time by carrying out the applied-for rental (resource advance necessary charging time DB (D-7)).

Next, the charging scheduling module 23 determines, as a second process, whether the above-described time necessary for charging for avoiding power shutoff can be provided during a period between the time of the end of preceding EV rental and the time of the start of the rental time indicated by the rental condition which was input in S1. For this determination, the charging scheduling module 23 determines whether the free time between the applied-for rental time and the advance rental time is greater than the already calculated D-8 and D-7.

By carrying out these first and second processes, the charging scheduling module 23 determines the possibility/impossibility of the EV rental based on the content of the application.

If the rental based on the content of the application, is impossible and the quick charger is usable in the applied-for rental time (YES in step S5), the charging scheduling module 23 calculates a difference between the residual battery capacity before the EV rental and the necessary charging amount estimated in step S2. Based on this difference, the charging scheduling module 23 calculates a time necessary for charging the necessary charging amount that is necessary for rental, in the case of performing charging by using the quick charger. In addition, the charging scheduling module 23 determines whether this calculated time can be provided during a period between the time of the end of preceding EV rental and the time of the start of the rental time indicated by the rental condition that was input in S1. By carrying out this determination, the charging scheduling module 23 determines the possibility/impossibility of the rental based on the content of the application.

If the rental based on the content of the application is possible, the charging scheduling module 23 calculates a charging time on the assumption that quick charging was performed, and displays this charging time by the quick charging schedule display module 12 (step S6).

If the rental based on the content of the application is impossible and the quick charger is not usable in the applied-for rental time (NO in step S5), the charging scheduling module 23 calculates a time slot in which charging can be scheduled, based on the information stored in the per-resource total necessary charging amount DB (D-3) 53 and resource necessary charging time DB (D-4) 54. The charging scheduling module 23 causes the information of this calculated time slot to be re-displayed to the user by the schedulable range display module 13.

The case in which the quick charger is not usable in the applied-for rental time is, for example, a case in which it has been determined that the quick charger is to be used for another EV in the applied-for rental time, or a case where an EV, for which quick charging was performed previously, is parked in a parking lot where quick charging can be performed.

By effecting such display, the user can be prompted to try a change of the content of the application (step S7).

FIG. 5 is a view illustrating an example of a screen displaying a re-calculated schedule.

The screen illustrated in FIG. 5 reflects the calculated result of S6, S7. In (Item 11) on this screen, a charging schedule at a time when the quick charger is usable is indicated. In this case, regardless of whether charging to the EV by the quick charger is necessary in order to carry out the determined rental, the charging schedule, which can be reserved, is made free as much as possible, by indicating that the shortest charging time in the case of using the quick charger for each resource is "Charging period (indispensable)".

In (Item 12) on the screen illustrated in FIG. 5, the charging time by ordinary charging is divided into "Charging period (indispensable)" and "Charging period (reservable)". A time slot corresponding to "Charging period (reservable)" is a time slot in which rental can be reserved.

When the user has approved the presented rental schedule, the schedule management module 33 records the resource rental schedule at the time of the approval in the resource rental schedule DB (D-2) 52, and updates the resource rental schedule. In addition, the schedule management module 33 records the charging schedule in the resource charging schedule DB (D-6) 56, and updates the charging schedule. Further, the schedule management module 33 records the shortest charging schedule in the quick charger schedule DB (D-9) 59 and updates the charging schedule.

Moreover, if the rentable schedule does not agree with the user's desired rental time and the user gave up the EV rental, the schedule management module 33 does not update the various DBs and terminates the operation (step S8).

Next, an operation corresponding to an actual schedule is described.

In this case, a car rental system using one EV is assumed and, for the purpose of simple description, it is assumed that the number of EVs which are objects of resources is one (Rsc1).

FIG. 6 is a view illustrating an example of a resource schedule in a table form.

In this case, a process is described by using a resource use schedule display view, in which the resource rental schedule DB (D-2) 52, resource charging schedule DB (D-6) 56 and quick charger schedule DB (D-9) 59 are merged.

To begin with, an advance condition is described. It is assumed that two resource rental reservations of the EV have already been made, and the rental times are 8:00~10:00, and 17:00~20:00, respectively. In addition, since the interval between both rental times is large, an ordinary charger is being used for actual charging of the EV.

Next, an input of a rental condition is described. It is now assumed that when an applicant inputs the rental condition, the present rental state is first presented to the user.

In an ordinary car rental system, in many cases, the actual rental state of resources is not presented to users. This aims at optimizing resource operations based on cancels or changes after applications. A mode is now considered in which the resource rental state is presented to the user. It is assumed that when this rental state is displayed, a rental user inputs "user ID" on a login screen (not show) and logs in.

In this case, the user I/F 1 displays to the user, as the state of the resource, "(A) a time slot in which another applicant is renting, or rental is not possible due to maintenance", "(I) a time slot in which charging is being performed", and "(U) a time slot in which neither charging nor rental is being done".

Before the rental condition is input, the content of the application is not clear. Thus, the user I/F 1 displays to the user, as "(I) a time slot in which charging is being performed", a charging time in a case of performing full charging after some other rental. In addition, when a quick charger can be used after the other rental, the user I/F 1 displays to the user, as "(I) a time slot in which charging is being performed", a charging time in a case of using the quick charger.

FIG. 7 is a view illustrating an example of an initial display screen in a case where quick charging is possible.

On this initial display screen, as rental times, "8:00~10:00" of No. 1 and "17:00~20:00" of No. 4 in the schedule shown in FIG. 6 are displayed. In this display, since the interval between the other determined rental times is large, a sufficient charging time for full charging for the next rental can be secured. Thus, on the initial display screen, "10:00~10:30" of No. 3 and "20:00~20:30" of No. 6 in the schedule shown in FIG. 6 are displayed as quick charging times for enabling, without power shutoff, the rental by the above-described rental time.

In addition, in the schedule illustrated in FIG. 7, information is set which indicates whether a charging plan from the start time to end time of the row, among the respective rows, in which the record type is "Charging (ordinary charging)" or "Quick charging", is a charging plan applied to the actual schedule. In this example, "10:00~12:00" as a charging time by ordinary charging of the row of No. 2 and "20:00~22:30" as a charging time by ordinary charging of the row of No. 5 become a charging plan applied to the actual schedule.

In addition, if quick charging is not possible, the user I/F 1 displays a charging schedule which is carried out by ordinary charging.

FIG. 8 is a view illustrating an example of the initial display screen in a case where only ordinary charging can be performed.

On this screen, as rental times, "8:00~10:00" of No. 1 and "17:00~20:00" of No. 4 in the schedule shown in FIG. 6 are displayed. Together with this display, "10:00~12:00" of No. 2 and "20:00~22:30" of No. 5 in the schedule shown in FIG. 6 are displayed as ordinary charging times for enabling, without power shutoff, the rental by the above-described rental time.

On the initial display screen, the applicant can input the rental condition. An indispensable item is, for instance, a desired use time which is composed of a rental start time and a rental end time. In addition, items may be, for instance, "Destination", "Planned travel distance", "Purpose of use", "Number of fellow passengers", and "Load". As the degree of accuracy of information of the rental condition becomes higher, the accuracy of estimation of the necessary charging amount for EV rental by the applicant increases, and it is thus highly possible that the charging amount can be reduced. It is now assumed that the applicant applies for rental in a time slot of 14:00~16:00.

In addition, even in the case where the resource rental state is not displayed to the applicant by the user I/F 1 and only an acquirable schedule is displayed, it is thinkable to display, in association with the resource, a rentable time as a time excluding the other rental time and charging time.

Next, the estimation of the necessary charging time is described.

The necessary charging amount estimation module 21 of the charging scheduler 2 estimates the charging amount that is necessary for EV rental according to the condition of the application, based on the content of the condition of the application, which was input by the applicant. In order to estimate the charging amount, the necessary charging amount estimation module 21 determines a model among a plurality of necessary charging amount evaluation models, based on the input information and user's use history, according to what accuracy the necessary power amount is to be estimated with.

Next, a description is given of various logics relating to the estimation of the necessary charging amount.

(Logic 1-a) If the applicant does not frequently use the car rental and the content of the application is only the desired rental time slot, the necessary charging amount estimation module 21 estimates a charging amount in a case of full driving in the applied-for time slot.

(Logic 1-b) If the applicant frequently uses the car rental and the rental time and power amount are always constant, the necessary charging amount estimation module 21 estimates that the power amount, which is usually used by the applicant, is the necessary charging amount.

(Logic 1-c) If the mode of use of car rental by the applicant varies from rental to rental, but the purpose is shopping and the destination is a shopping mall, the necessary charging amount estimation module 21 estimates that the necessary power amount for the EV driving on the route to the shopping mall is the necessary charging amount.

In addition, if a plurality of necessary charging amount evaluation models are applicable with the same content of the application, the necessary charging amount estimation module 21 uses the model, which is deemed to be most accurate, for the estimation of the necessary charging amount, based on the accuracy of estimation in each necessary charging amount evaluation model. In this case, it is possible that logic 1-a and logic 1-b overlap or logic 1-a and logic 1-c overlap. However, the accuracy of logic 1-a is lower than the accuracy of logic 1-c. Thus, the necessary charging amount estimation module 21 estimates the necessary charging amount by logic 1-b or logic 1-c, and stores the information of the estimated necessary charging amount in the per-resource total necessary charging amount DB (D-3) 53.

Next, the estimation of the necessary charging time is described.

The necessary charging time estimation module 22 of the charging scheduler 2 estimates a necessary charging time as a necessary time for charging the necessary charging amount of the EV, based on the information which was estimated by the necessary charging amount estimation module 21 and stored in the per-resource total necessary charging amount DB (D-3) 53.

When a charger connection protocol, such as CHAdeMO™ or Combined Charging System, is used, the charging requirement is issued from the vehicle of the EV. Because of this and the electrical characteristics of the battery, the necessary charging time becomes a nonlinear function having as parameters a car type, a residual battery capacity, a necessary charging amount, a temperature, etc. As a method of calculating the necessary charging time, it is possible to think of, in usual cases, a method of creating in advance, for example, a table in which necessary charging times corresponding to residual battery capacities/necessary charging amounts for respective car types and respective temperature ranges are described, and searching for a necessary charging time from this table.

The necessary charging time estimation module 22 estimates, as a first function, a necessary charging time by ordinary charging, and stores the information of this necessary charging time in the resource necessary charging time DB (D-4) 54. In addition, the necessary charging time estimation module 22 estimates, as a second function, a necessary charging time by quick charging, and stores the information of this necessary charging time in the resource necessary charging time for quick charging DB (D-5) 55. In this case, the necessary charging time estimation module 22 estimates that the necessary charging time by ordinary charging was calculated as 2 hours and the necessary charging time by quick charging was calculated as 0.5 hour.

Next, the charging scheduling is described.

The charging scheduling module 23 of the charging scheduler 2 estimates whether charging scheduling based on the content of the application is possible or not, based on the necessary charging times stored in the resource necessary charging time DB (D-4) 54 and the resource necessary charging time for quick charging DB (D-5) 55.

As the standpoints relating to whether the scheduling is possible or not, the following two may be mentioned.

The first standpoint is that when the EV is newly rented, power shutoff, that is, battery shutoff, does not occur. The second standpoint is that, by the new rental of the EV, power shutoff does not occur in a subsequent rental period.

Figure 9:
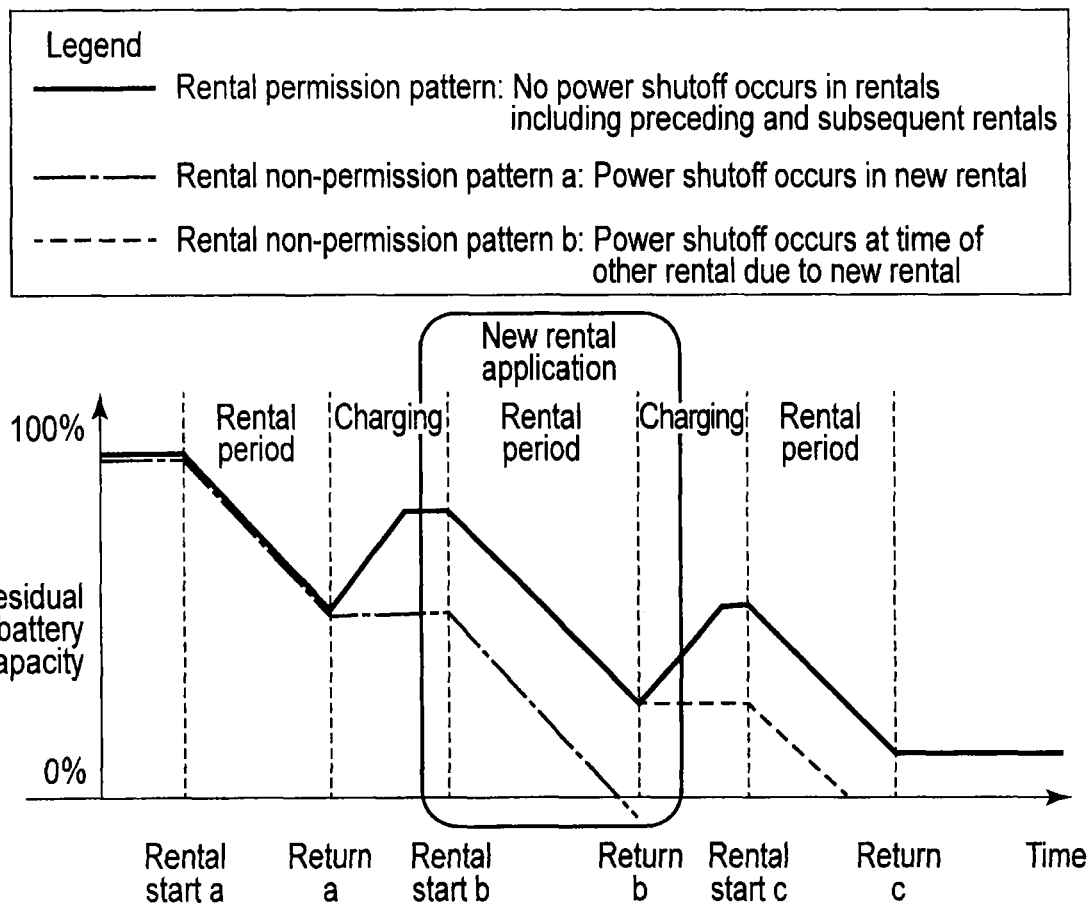
FIG. 9 is a view illustrating an example of check points for indicating whether charging scheduling is possible or not.

FIG. 9 is a view illustrating an example of check points for indicating whether charging scheduling is possible or not.

Next, a logic example of determining whether charging scheduling is possible or not is illustrated.

To begin with, the charging scheduling module 23 confirms that the applied-for rental time and the other determined rental time do not overlap.

If the rental times do not overlap, the charging scheduling module 23 calculates the resource total necessary charging time D-8 for satisfying the necessary charging amount based on the content of the rental application. The charging scheduling module 23 confirms whether charging of the EV is possible in the free time in the case where the content of the rental application was approved.

The charging scheduling module 23 surveys the entire charging schedule including rentals before and after the applied-for rental. The charging scheduling module 23 calculates the resource advance necessary charging time D-7 as the time for satisfying the charging amount for avoiding deficiency in power amount at the time of each rental, by the ordinary or quick charging in the free time on the assumption that the application was accepted. The charging scheduling module 23 confirms whether power shutoff occurs in the resource in rentals after the applied-for rental.

If it can be confirmed that the deficiency in power amount will not occur, the charging scheduling module 23 accepts the application for EV rental, determines that the EV can be rented by this application, and sets the charging time of the EV for which the rental application was made.

FIG. 10A, FIG. 10B and FIG. 10C are views illustrating information for confirming the necessary power amount in table form.

FIG. 10A, FIG. 10B and FIG. 10C illustrate confirmation of the necessary power amount in the above logic 1-c. The details are illustrated below.

(1) As a whole, a status of "rental-free" is entered as a schedule in columns of tables shown in FIG. 10A, FIG. 10B and FIG. 10C, and numerical values to be calculated are entered in necessary locations of respective rows of the column in which the status has been entered. In R-7 row of C-1 column as a first column in which a status is entered, an initial retention power of the EV as an initial value is entered. In addition, in R-7 row of C-9 column as a last column, finally necessary power is described as a final state.

This structure is a structure in which it is considered that the schedule is divided by some division of time, for example, division of maintenance or rental, in a case where no halt period is provided because of, for example, a 24-hour operation of a car rental facility.

(2) R-1 row in the table shown in FIG. 10A indicates a use start time of the EV, and R-2 row indicates a use end time. The information of the use start time and use end time is stored in the resource rental schedule DB (D-2) 52.

(3) R-3 row in the table shown in FIG. 10A is a row indicating a rental time. This rental time is a difference between the use end time described in R-2 row and the use start time described in R-1 row.

(4) R-4 row in the table shown in FIG. 10A is a row indicating a rental-time power amount. This rental-time power amount is calculated by adding the retention power amount described in R-7 row of C-1 column and the charging amount (free-time possible charging amount) in a free time until EV rental as the charging amount described in R-9 row of C-2 column, and subtracting from this added result the power consumption amount until the rental as the power consumption amount described in R-5.

(5) An estimated power consumption amount described in R-5 row in the table shown in FIG. 10A is indicative of a power amount which is consumed by the EV during the rental that is the object, and is separately estimated.

(6) A rental-end-time residual battery capacity described in R-6 row in the table shown in FIG. 10A is calculated by subtracting the estimated power consumption amount described in R-5 row of a certain column from the rental-time power amount described in R-4 row of the same column, and is indicative of the residual battery capacity of the EV at a time of the end of certain rental.

(7) A retention power described in R-7 row in the table shown in FIG. 10A is, as described in (1), indicative of the initial residual battery capacity and a residual battery capacity which needs to remain at the end time.

(8) A free time described in R-8 row in the table shown in FIG. 10A is a free time between the end of certain rental and the start of the next rental with respect to the EV. This free time is calculated by subtracting the rental end time (R-2 row) of the previous rental from the rental start time (R-1 row) relating to the next rental.

(9) A free-time possible charging amount described in R-9 row in the table shown in FIG. 10A indicates a power amount which can be charged during the free time calculated in R-8 row of the same column. Various methods are thinkable for calculating this charging amount. The method varies depending on a specified charger or a specified battery. It is also thinkable to use a table by which the charging amount can be calculated by parameters of the present charging amount, charging time and temperatures.

(10) A rental-start-time necessary residual battery capacity described in R-10 row in the table shown in FIG. 10B is a calculation result of such a residual battery capacity that no power shutoff occurs from certain rental to the final state. This necessary residual battery capacity is calculated with respect to the rental start time of each rental.

This necessary residual battery capacity is calculated by the following equation:

$$\text{Necessary residual battery capacity } W_n = \quad (1)$$

$$W_L + D_n + \sum_{i=n+1}^{L} \max(D_i - C_i, 0)$$

$W_L$ in equation (1) designates a necessary charging amount that is to be satisfied in the final state, and n in equation (1) designates a number associated with the rental that is the object of calculation of the charging amount of the battery. L in equation (1) designates a number associated with the last rental leading to the final state. $D_i$ in equation (1) designates an estimated power consumption amount (R-5 row) in individual rental i. Ci in the accumulation symbol of equation (1) corresponds to the free-time possible charging amount described (R-9 row) before rental i.

In the present embodiment, since the necessary charging amount relating to "Reservation B" in C-5 column is to be confirmed, $W_L$ in equation (1) is 0 as a value of (R-7 column, C-9 row). In addition, n in equation (1) is the number of a column corresponding to C-5 column, and L in equation (1) is the number of the column corresponding to C-7 column. Besides, the column, which is entered in the accumulation symbol of equation (1), is only the column of C-7.

The estimated power consumption amount of the column of C-7 (C-7 column, R-5 row) is 35. However, the free-time possible charging amount (C-6 column, R-9 column), which can be charged before that, is only 6.666667 (≈6.67). In addition, the value of max (35~6.67, 0) as the necessary charging amount at the rental end time relating to "Reservation B" in C-5 column is 28.33.

Thus, the residual battery capacity needs to be "28.33" at the rental end time in "Reservation B" in C-5 column. In addition, "48.33" as the value obtained by adding "20" as the estimated power consumption amount (C-5 column, R-5 row) to the value of the residual battery capacity becomes the necessary power amount at the rental start time in "Reservation B" of C-5 column.

If the residual battery capacity at the time of start of certain rental is less than the necessary charging amount for the rental, power shutoff occurs. Thus, in the present embodiment, equation (1) is derived from the logic that if charging cannot be completed in the preceding free time, it is necessary to charge the power corresponding to the difference from a further preceding time.

(11) A necessary charging amount described in R-11 row as an eleventh row of the table shown in FIG. 10B is a difference between the rental-end-time residual battery capacity (R-6 row) as the residual battery capacity at the immediately prior rental end time and the rental-start-time necessary residual battery capacity (R-10 row) as the power amount that is necessary before the present rental. If the rental-end-time residual battery capacity (R-6 row) is greater than the rental-start-time necessary residual battery capacity (R-10 row), it is necessary to perform at least the charging for the difference.

(12) A resource advance necessary charging time (D-7) described in R-12 row as the 12th row of the table shown in FIG. 10B is a time necessary for charging the necessary charging amount calculated in R-11 row. In order to calculate the necessary charging time, it is thinkable to use the table described in the above (9). In this case, the resource advance necessary charging time (R-12 row) is set so as not to exceed the free time (R-8 row).

(13) A necessary charging time for quick charging described in R-13 row as the 13th row of the table shown in FIG. 10C indicates a time necessary for charging the necessary charging amount (R-11 row) by the quick charger. In order to calculate this time, for example, the table described in the above (9) is utilized.

(14) A largest possible charging amount described in R-14 row as the 14th row of the table shown in FIG. 10C indicates a charging amount at a reserved rental start time, which is stored in the battery when the power amount indicated by the free-time possible charging amount (R-9 row) is charged. As the difference between the necessary charging amount (R-10 row) and the largest possible charging amount (R-14) is greater, the charging schedule becomes a schedule with a larger allowance.

(15) A charging allowance described in R-15 row as the 15th row of the table shown in FIG. 10C indicates a difference between the largest possible charging amount (R-14) and the rental-start-time necessary residual battery capacity (R-10). This charging allowance is an index indicating a charging time which can be varied. In addition, when the charging allowance becomes negative, power shutoff occurs during rental or charging becomes necessary, and thus the charging schedule is not recommendable.

Next, the display of the rental time is described.

Before an input to the initial screen, the charging time is not clear. Thus, the charging time displayed on this screen is set to be relatively large, and the rentable time is set to be a short time. At this time point, if the charging schedule can be secured, the resource advance necessary charging time (R-12 row) corresponding to the clarified necessary charging amount (R-11 row) is reflected. Furthermore, if quick charging is possible, a shorter charging time is displayed by using the necessary charging time for quick charging (R-13 row). By this display, fine adjustment of the desired time slot of the reservation is enabled.

FIG. 11 is a view illustrating an example of the display screen of the rental time.

On this display screen illustrated in FIG. 11, compared to the initial display screen illustrated in FIGS. 7, "14:00~16:00" is newly displayed as a desired rental time slot by the quick charging schedule display module 12 of the user I/F 1, and "16:00~16:30" is newly displayed as a charging time by quick charging.

In addition, on the display screen illustrated in FIGS. 11, "10:00~12:00" and "20:00~22:30" are displayed as rentable charging times by the quick charging schedule display module 12, in place of the display of the charging times by quick charging as the display indicating "10:00~10:30" and "20:00~20:30" in FIG. 7.

Thus, "10:00~10:30" and "20:00~20:30" displayed as charging times can also be designated as rental times. Thereby, as shown in FIGS. 11, "14:00~16:00" of the desired rental time slot can be finely adjusted in a manner to partly or entirely overlap these rentable charging times.

Next, the display of the schedulable time is described.

FIG. 12 is a view illustrating an example of the display screen of the schedulable time.

When it is difficult to secure the charging schedule by the desired rental time slot, the rentable time is re-displayed on the display device by the schedulable range display module 13 of the user I/F 1. In this display, like the case where the charging schedule is securable, the content of the application has been understood. Thereby, the necessary charging amount can be reduced, compared to the time before the input to the initial screen.

On the initial display screen illustrated in FIG. 7, the schedulable range display module 13 of the user I/F 1 displayed the charging times by quick charging as the times displayed as "10:00~10:30" and "20:00~20:30". By contrast, on the screen illustrated in FIG. 12, the quick charging schedule display module 12 displays "10:00~12:00" and "20:00~20:30" as rentable charging times on the display device. Accordingly, "10:00~10:30" and "20:00~20:30" displayed as charging times on the initial display screen illustrated in FIG. 7 can be designated as rental times on the screen illustrated in FIG. 12. Thereby, since the time slots, which can be designated as rental times, can be increased, the possibility that an advance rental application can be made becomes higher.

Next, the determination of the schedule is described.

If the user has determined the rental reservation of the resource, the schedule management module 33 of the resource management module 3 updates the resource rental schedule DB (D-2) 52, resource charging schedule DB (D-6) 56, and quick charger schedule DB (D-9) 59.

FIG. 13 is a view illustrating an example of a new rental schedule in a table form.

This screen is a screen of the rental schedule in the case where, according to the screen illustrated in FIG. 11, there is no change of the rental time displayed on this screen, and the rental reservation of the resource has been determined. In this rental schedule, the information items of No. 4 to No. 6 in the schedule shown in FIG. 6 are changed to information items of No. 7 to No. 9, the determined rental time is set as new information of No. 4, an ordinary charging time after this rental is set as new information of No. 5, and a quick charging time after the rental of No. 4 is set as new information of No. 6.

In addition, in this schedule illustrated in FIG. 13, like the schedule shown in FIG. 7, information indicating whether the charging plan is a charging plan applied to the actual schedule is set with respect to each row. In this example, "10:00~12:00" as a charging time by ordinary charging of the row of No. 2, "16:00~17:00" as a charging time by ordinary charging of the row of No. 5, and "20:00~23:30" as a charging time by ordinary charging of the row of No. 8 become charging plans which are applied to the actual schedule.

In addition, on the display screen of the rental time as the screen illustrated in FIGS. 11, "16:00~16:30" is displayed as the quick charging time. However, even if ordinary charging is started from 16:00, the charging ends at 17:00, as indicated in No. 5 of the table shown in FIG. 13, and does not overlap "17:00~20:00" as the next rental time indicated in No. 7 of the table shown in FIG. 13. Thus, as described above, "16:00~17:00" by ordinary charging becomes a charging plan which is applied to the actual schedule.

Besides, when a plurality of EVs are present at the same location, the charging schedule of each EV is calculated, and such handling is adopted that a most effective vehicle or a vehicle desired by the user is allocated.

Furthermore, a GUI (Graphical User Interface) for displaying the schedule may have such variations as to display the rental time of each vehicle, or the time in which any one of vehicles can be rented.

In the present embodiment, in the case of sharing resources which, owing to the operation by batteries, require time for charging and vary in charging time depending on the manner of use, it is possible to shorten the time of maintenance and to improve the operation efficiency of resources.

Specifically, in the present embodiment, by displaying the rentable charging time in the case of utilizing the quick charging time, the rentable time can be increased. Thereby, it is possible to stipulate, on the system side, whether or not to use a tool with restrictions in use, which is effective in shortening the charging time, such as quick charging. Thus, the user does not need to be aware of the type of charging, when designating the resource desired by the user, and setting the desired rental time slot.

In addition, when the quick charging can be used, since the charging time of the resource is decreased by making a charging schedule by quick charging where necessary, the operation efficiency of the resource is improved.

Furthermore, in the present embodiment, by the user inputting the detailed information of the rental conditions, for instance, the destination, the power amount necessary for rental can be estimated. By executing this estimation, it becomes possible to decrease the necessary charging amount and charging time before and after the rental. Accordingly, even when quick charging cannot be performed and only ordinary charging can be performed, the rental time slot can flexibly be designated. Thereby, the scope of users who can rent can be increased, and the operation efficiency of resources can be enhanced.

According to the above embodiments, it is possible to provide a charging management system which can improve the operation efficiency of resources by combining ordinary charging and quick charging.

While a certain embodiment has been described, this embodiment has been presented by way of example only, and is not intended to limit the scope of the inventions. Indeed, the novel embodiment described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging management system comprising:
a first charging device which charges an electric vehicle for rental, and a second charging device which charges the electric vehicle in a shorter necessary time than the first charging device,
wherein said charging management system comprises a charging scheduler configured to perform control of storing in a database:
(a) information indicating a rental time slot as a time slot in which a rental reservation of the electric vehicle has been made,
(b) information indicating a charging time slot in which the second charging device is usable and charging to the electric vehicle by the second charging device is performed for enabling rental of the electric vehicle in the rental time slot,
(c) information indicating a charging time slot in which the second charging device is not usable and charging to the electric vehicle by the first charging device for enabling the rental of the electric vehicle is performed in the rental time slot, and
(d) information indicating a transition of a stored power amount of the electric vehicle, due to the rental of the electric vehicle and the charging to the electric vehicle;
wherein said charging management system comprises an interface configured to output to a display a time slot which is settable as a new desired rental time slot of the electric vehicle, based on:
(e) a charging time slot on an assumption that the charging to the electric vehicle is performed by the second charging device in a time slot in which the second charging device is usable,
(f) a charging time slot of charging to the electric vehicle by the first charging device in a time slot in which the second charging device is not usable, and
(g) the rental time slots stored;
wherein said charging scheduler performs control of:
calculating a power amount which is necessary for renting the electric vehicle with respect to a desired rental time slot of the electric vehicle, in the time slots output indicated by the information stored in a first database, and storing information indicating the calculated power amount in a second database;
calculating, based on the power amount indicated by the information stored in the second database, a time slot in which charging by the first and second charging devices is necessary and a time slot in which charging by the second charging device is necessary as charging for enabling the rental of the electric vehicle in the desired rental time slot, storing information indicating the time slot in which charging by the first charging device is necessary in a third database, and storing information indicating the time slot in which charging by the second charging device is necessary in a fourth database;
outputting, based on the information stored, the desired rental time slot as a time slot in which the electric vehicle is rentable, if the charging for enabling the rental of the electric vehicle in the desired rental time slot indicated by the information stored in the second database and the rental time slot is possible in the time slot indicated by the information stored in the third database or the time slot indicated by the information stored in the fourth database;

outputting, if the charging to the electric vehicle by the first charging device can be finished before a start of the desired rental time slot, the desired rental time slot to be the time slot in which the electric vehicle is rentable, and then outputting a predetermined time before the start of the desired rental time slot to be a charging time by the first charging device to the electric vehicle;

outputting, if the charging to the electric vehicle by the second charging device can be finished before the start of the desired rental time slot but the charging to the electric vehicle by the first charging device cannot be finished before the start of the desired rental time slot, the desired rental time slot to be the time slot in which the electric vehicle is rentable, and then setting a predetermined time before the start of the desired rental time slot to be a charging time by the second charging device to the electric vehicle;

calculating an advance necessary charging time necessary for charging to the electric vehicle by the first or second charging device for a difference between the stored power amount of the electric vehicle in an end time of a preceding rental and the stored power amount of the electric vehicle as the power amount that is necessary in the start time of the desired rental time slat before the desired rental time slot to avoid deficiency in a stored power amount of the electric vehicle during the desired rental time slot and the rental time slat after the desired rental time slot, based on information indicating a transition of the stored power amount of the electric vehicle and the calculated power amount necessary for renting the electric vehicle with respect to the desired rental time slot, and outputting, if the advance necessary charging time is provided during a period between the end time of the preceding rental and a start time of the desired rental time slot, the desired rental time slot as a time slot in which the electric vehicle is rentable, wherein the outputting includes displaying a display screen, the display screen indicating each of: a rental time slot in which the electric vehicle is rented; and a rentable charging time including a time at which a quick charging by the second charging device is available.

2. The charging management system of claim 1, wherein said charging scheduler performs control of calculating, based on the rental application information including a purpose of use of the electric vehicle, an actual use time of the electric vehicle in the desired rental time slot, calculating the power amount, taking the calculated time into account, and storing the calculated power amount in the second database.

* * * * *